US012630412B2

(12) United States Patent
Szeteli et al.

(10) Patent No.: US 12,630,412 B2
(45) Date of Patent: May 19, 2026

(54) DISPENSING SYSTEM

(71) Applicant: AS Strömungstechnik GmbH, Ostfildern (DE)

(72) Inventors: Andreas Szeteli, Filderstadt (DE); Nico Fischer, Stuttgart (DE)

(73) Assignee: AS Stromungstechnik GmbH, Ostfildern (DE)

( * ) Notice: Subject to any disclaimer, the term of this patent is extended or adjusted under 35 U.S.C. 154(b) by 0 days.

(21) Appl. No.: 18/830,657

(22) Filed: Sep. 11, 2024

(65) Prior Publication Data

US 2025/0083944 A1 Mar. 13, 2025

(30) Foreign Application Priority Data

Sep. 11, 2023 (DE) ......................... 102023124452.3

(51) Int. Cl.
*B67D 7/02* (2010.01)

(52) U.S. Cl.
CPC .................................. *B67D 7/0288* (2013.01)

(58) Field of Classification Search
CPC .................................................... B67D 7/0288
USPC .......................................................... 141/346
See application file for complete search history.

(56) References Cited

U.S. PATENT DOCUMENTS 8,539,997 B2 * 9/2013 Driftmeyer ............. B67D 7/42 137/554

FOREIGN PATENT DOCUMENTS

DE 102021116140 A1 12/2022
GB 2575145 * 4/2019 ............ B65D 49/08

* cited by examiner

*Primary Examiner* — Timothy L Maust
(74) *Attorney, Agent, or Firm* — Von Rohrscheidt Patents

(57) ABSTRACT

A dispensing system with a dispense head and at least one container. The dispense head is connectable to a container opening of the container by means of a screw connection, so that stored material is dispensable from or suppliable to the container by means of the dispense head. There is an actuating ring on the dispense head, wherein the screw connection is established by rotating the actuating ring in a closure direction. The screw connection is released by rotating the actuating ring in a release direction. The actuating ring has an overload protection by means of which an effective closure torque is limited to a limit closure torque when the screw connection is established.

14 Claims, 6 Drawing Sheets

DISPENSING SYSTEM

CROSS REFERENCE TO RELATED APPLICATIONS

This application claims the priority of DE 102023124452.3 filed on 2023 Sep. 11; this application is incorporated by reference herein in its entirety.

BACKGROUND

The invention relates to a dispensing system according to the preamble of claim 1.

Such a dispensing system is known from DE 10 2021 116 140. This dispensing system is used for filling and draining containers, particularly barrels, filled with liquid chemicals. The dispensing system comprises a dispense head, which can be fastened to a dip tube of a container. By means of the dispense head, via the dip tube, liquid can be dispensed from the container or liquid can be supplied to the container.

The dispense head can be fastened to the dip tube by means of a screw connection. For creating this screw connection, the dip tube has a thread. Accordingly, the dispense head has a corresponding mating thread.

One problem with such screw connections is that if the thread is screwed into the mating thread with too high a closure torque, the screw connection is so tight that it is only possible to release the screw connection with increased effort, since the thread is then tilted on the mating thread or jammed there.

Especially if the thread and the mating thread are made of plastic, excessive closure torque can damage the thread and the mating thread.

SUMMARY

The invention relates to a dispensing system (1) with a dispense head (4) and at least one container (2). The dispense head (4) is connectable to a container opening (6) of the container (2) by means of a screw connection, so that stored material is dispensable from or suppliable to the container (2) by means of the dispense head (4). There is an actuating ring (15) on the dispense head (4), wherein the screw connection is established by rotating the actuating ring (15) in a closure direction. The screw connection is released by rotating the actuating ring (15) in a release direction. The actuating ring (15) has an overload protection by means of which an effective closure torque is limited to a limit closure torque when the screw connection is established.

DETAILED DESCRIPTION

The object of the invention is to provide dispensing systems of the type described above with a high degree of functionality and functional reliability.

The features of the independent claims are provided to solve this object. Advantageous embodiments of the invention and appropriate further developments are described in the dependent claims.

The invention relates to a dispensing system with a dispense head and at least one container. The dispense head is connectable to a container opening of the container by means of a screw connection, so that stored material is dispensable from or suppliable to the container by means of the dispense head. There is an actuating ring on the dispense head, wherein the screw connection is established by rotating the actuating ring in a closure direction. The screw connection is released by rotating the actuating ring in a release direction. The actuating ring has an overload protection by means of which an effective closure torque is limited to a limit closure torque when the screw connection is established.

The overload protection of the actuating ring according to the invention prevents excessive closure torques when establishing the screw connection between the dispense head and the container opening of the container, since the overload protection automatically limits the acting closure torque to a limit closure torque.

This prevents overloading the components of the screw connection, which could lead to impairment or damage to the screw connection.

This is particularly advantageous if the components of the screw connection are made of plastic. Plastic components of the screw connection can be relatively easily deformed and thus damaged. Such impairments are reliably avoided with the overload protection according to the invention.

The actuating ring is advantageously connected to a thread. By rotating the actuating ring, the thread is screwable onto or unscrewable from a mating thread in the area of the container opening.

The thread and the mating thread, like the actuating ring itself, are advantageously made of plastic and can thus be manufactured efficiently as plastic injection-molded parts.

For practical purposes, the thread is an external thread and the mating thread is an internal thread.

Depending on the design, the mating thread is located in the container opening or in a dip tube mounted in the container opening.

According to an advantageous embodiment, the actuating ring has an outer ring and an inner ring firmly connected to the thread. A detachable coupling of the outer ring and the inner ring is effected by means of the overload elements forming the overload protection.

The outer jacket surface of the inner ring closely rests against the inner jacket surface, wherein the outer ring and the inner ring are rotatable around a common axis of rotation.

The jacket surface of the inner ring and outer ring are thus close together with little play and can be rotated against each other.

Due to the fixed connection between the inner ring and the thread, when the inner ring is rotated, the thread is corotated therewith. Advantageously, the inner ring and the thread are made of a plastic injection-molded part.

The function of the overload protection designed in this way is such that overload elements in a locking position cause a coupling of the outer ring and the inner ring so that the inner ring is corotated when the outer ring is rotated. When a limit closure torque is reached when the screw connection is established, the overload elements are automatically transferred to a release position so that the inner ring is not corotated when the outer ring is rotated in the closure direction.

In an initial state, the overload elements are in their locking positions so that there is a fixed coupling between the outer ring and the inner ring.

If a user rotates the outer ring in the closure direction, the inner ring is corotated, whereby the thread on the actuating ring is screwed into the mating thread of the container opening or the dip tube. This only takes place until the limit closure torque is reached. As soon as the limit closure torque is reached, the overload elements are automatically transferred to their release position, in particular by a mechanical forced guidance, and the outer ring is decoupled from the inner ring so that the inner ring is not corotated when the outer ring is rotated.

If the screw connection is to be released, the overload elements are automatically transferred from the release position to the locking position when the actuating ring is rotated in the release direction.

The transfer of the overload elements from the release position to the locking position also takes place by means of a mechanical forced guidance.

The inner ring then again corotates with the outer ring so that the releasing of the screw connection is possible.

According to an advantageous design, each overload element has a locking segment spring-mounted in a cavity running in the radial direction and opening out on the inner jacket surface of the outer ring.

Correspondingly, the inner ring has a plurality of recesses arranged at a distance from one another in the circumferential direction and opening out on its outer jacket surface, wherein in the locking position of an overload element its locking segment projects into one of the recesses.

If a locking segment is located opposite a recess, the locking segment is guided into the recess by means of the spring force of a spring element, whereby a fixed coupling is effected between the outer ring and the inner ring, i.e. the inner ring is corotated when the outer ring is rotated.

In contrast, in the release position of an overload element, its locking segment rests against the outer jacket surface of the inner ring, as a result of which the locking segment is fully retracted into the cavity.

By pressing the locking segment against the outer jacket surface of the inner ring, which jacket surface lies between two recesses, the locking segment is pressed into the cavity against the spring force of the spring element. The outer ring is then decoupled from the inner ring so that a rotation of the outer ring is not transferred to the inner ring.

This design provides a simple mechanical forced guidance for coupling and decoupling the outer ring and the inner ring.

According to a geometrically favorable design, the recesses are identical and arranged equidistantly in the circumferential direction of the inner ring.

The number of recesses is greater than the number of overload elements, wherein the arrangement of the overload elements on the outer ring is adapted to the arrangement of the recesses on the inner ring in such a way that when the outer ring and the inner ring are coupled, the locking segments of all overload elements respectively engage in one of the recesses.

This means that the arrangement of the recesses in the inner ring is optimally adapted to the number and arrangement of the overload elements on the outer ring.

A key aspect of the design of the overload protection is that each recess is bounded by a wall, wherein a segment of the wall lying in the closure direction has a flatter gradient than the segment of the wall lying in the release direction.

The gradient of the segment of the wall lying in the closure direction is dimensioned in such a way that the locking segment is guided out of the recess via this segment of the wall when the limit closure torque is reached.

In contrast, the gradient of the segment of the recess lying in the release direction is dimensioned in such a way that the locking segment is held in the recess when the actuating ring is rotated in the release direction.

This asymmetrical design of the wall of each recess ensures that the locking segment automatically disengages from the recess when the actuating ring is rotated in the closure direction when the limit closure torque is reached, since the locking segment slides out of the recess along the segment of the wall with the flatter gradient due to the closure torque applied.

If the screw connection is to be released, the outer ring first rotates in relation to the inner ring until each locking segment engages in a recess. As the outer ring continues to rotate in the release direction, each locking segment rests against the wall segment with a large gradient and is thus secured against disengagement from the recess. This causes the inner ring to rotate with the outer ring and the screw connection is released.

An advantageous effect of the overload protection according to the invention is that the or each overload element, in particular each locking segment, generates a clicking sound when it is guided out of the recess.

If the actuating ring is rotated manually by a user to establish the screw connection, the clicking sound indicates to him when the limit closure torque has been reached, which further increases functional reliability.

Alternatively, the actuating ring can be actuated by a robot, in particular if the entire handling of the dispensing system is automated and robot-controlled.

BRIEF DESCRIPTION OF THE DRAWINGS

The invention is explained below on the basis of the drawings. The drawings show.

DETAILED DESCRIPTION OF THE PREFERRED EMBODIMENTS

Figure 1:
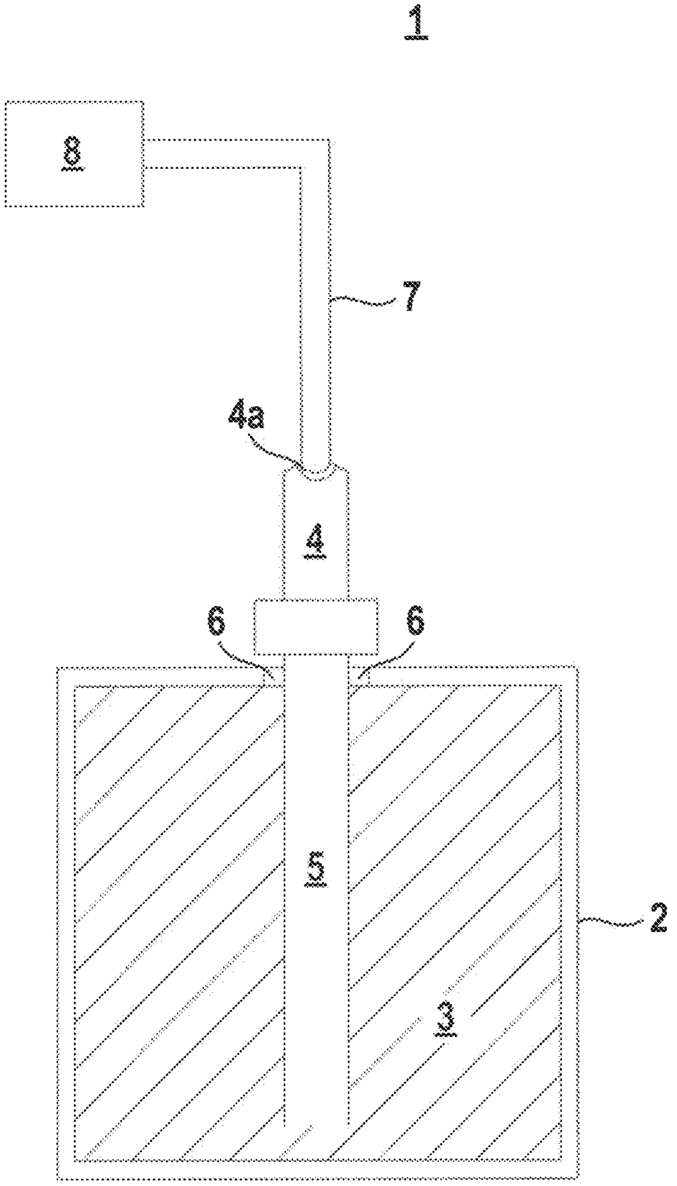
FIG. 1: Schematic depiction of the dispensing system according to the invention.

FIG. 1 shows schematically an exemplary embodiment of the dispensing system 1 according to the invention for transportable containers 2, which in particular can be barrels, bottles or similar. A liquid 3 is stored as stored goods in the respective container 2. Liquids 3 stored in such containers 2 are in particular liquid specialty chemicals.

The dispensing system 1 comprises a dispense head 4, which can be fastened to a dip tube 5. The dip tube 5 is supported in a container opening 6 of the container 2, and is thus firmly connected to the container 2. The longitudinal axis of the dip tube 5 projecting into the interior of the container 2 runs in a vertical direction.

The dispense head 4 is used for dispensing liquids 3 from the container 2. Likewise, this can be used for filling containers 2. For this purpose, the dispense head 4 has a liquid connection 4*a* at its upper end. A line 7 that leads to a pump 8 is connected to this liquid connection 4*a*. The line 7 can be formed as a hose. The pump 8 is controlled by a control unit (not shown).

Figure 2:
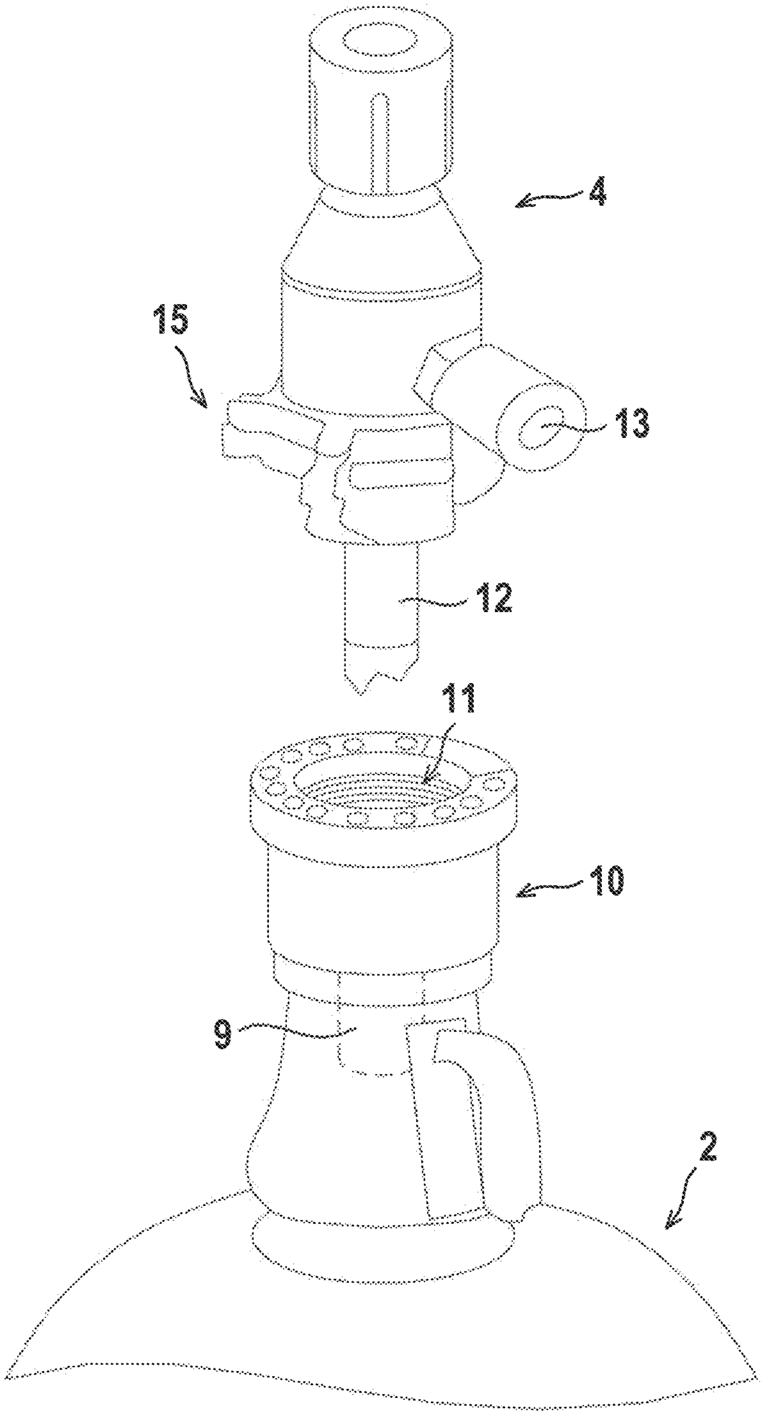
FIG. 2: Partial depiction of the dispensing system according to FIG. 1 with a container having a dip tube and a dispense head.
Figure 3:
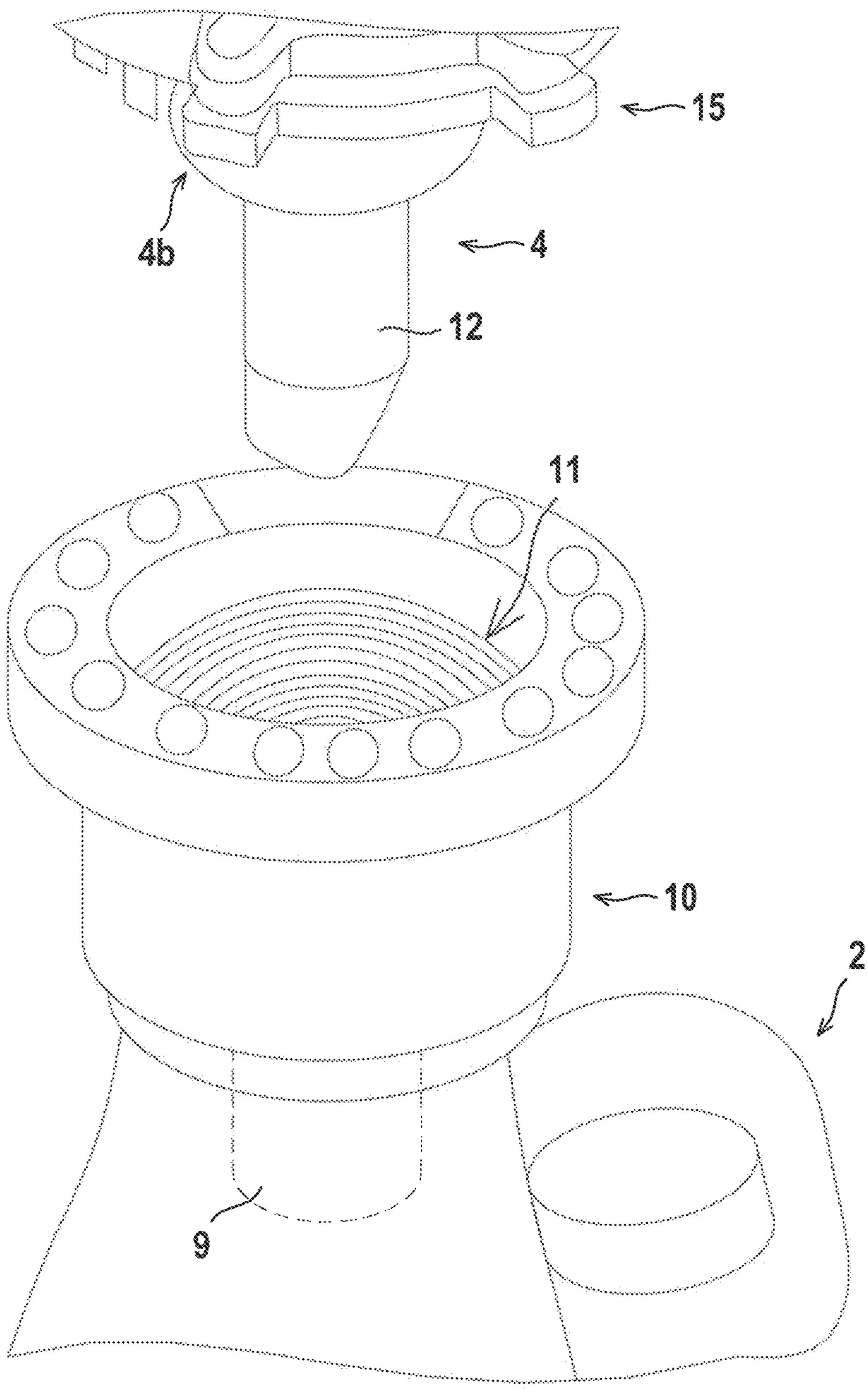
FIG. 3: Enlarged partial depiction of the arrangement according to FIG. 2.
Figure 4:
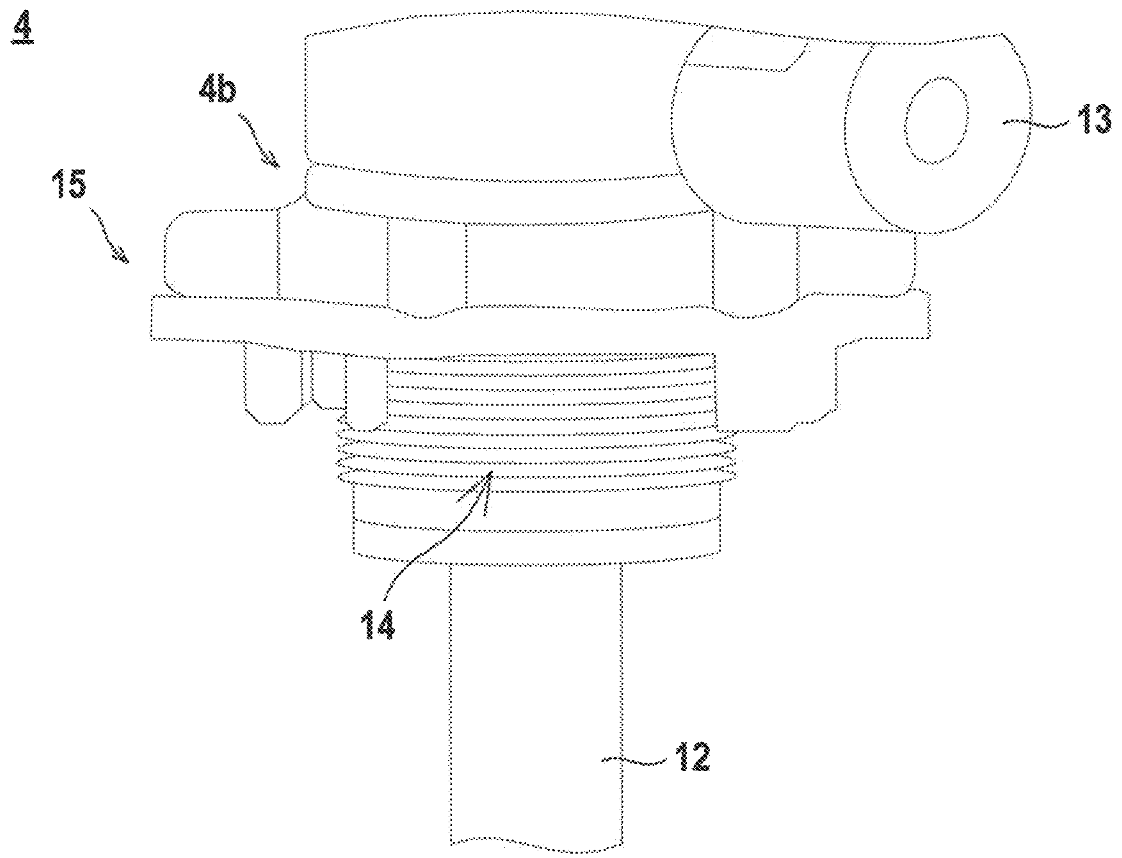
FIG. 4: Individual depiction of a section of the dispense head of the dispensing system according to FIG. 1.

FIGS. 2 and 3 show the dispense head 4 with the associated container 2. FIG. 4 shows an individual depiction of a section of the dispense head 4.

The dip tube 5 has a hollow cylindrical tube body 9 and a head part 10 at the upper side of the tube body 9 (FIGS. 2 and 3). The head part 10 is supported at the container opening 6 at the upper side of the container 2 in such a way that the tube body 9 projects into the container 2. The dip tube 5 consists of plastic.

As shown in FIGS. 2 and 3, the head part 10 has an opening with a circular cross section, which opening opens out at the upper side of the head part 10.

An internal thread 11 is provided as connection means at the inner wall delimiting the opening. Like the rest of the dip tube 5, the connection means with the internal thread 11 consists of plastic.

As can be seen in particular from FIGS. 2 and 4, the dispense head 4 has a base body 4*b*, at the upper end of which the liquid connection 4*a* is provided. A liquid channel not shown runs inside the base body 4*b* from the liquid connection 4*a*, to which liquid channel a tubular lug 12 is connected which opens out at the lower end of the base body 4*b*. A ventilation port 13 opens out laterally on the base body 4*b*. The dispense head 4 consists of plastic.

Above the tubular lug 12, at the lower edge of the base body 4*b*, a connection means is designed in the form of an external thread 14. The external thread 14 is designed complementary to the internal thread 11 of the dip tube 5. These connection means with the external thread 14 also consist of plastic.

To establish and release a screw connection, the external thread 14 of the dispense head 4 is screwed into the internal thread 11 of the dip tube 5.

The external thread 14 is screwed into and unscrewed from the internal thread 11 by means of an actuating ring 15 on the dispensing head 4, wherein the actuating ring 15 is coupled to the external thread 14.

To establish the screw connection, the actuating ring 15 is rotated in a closure direction. To release the screw connection, the actuating ring 15 is rotated in the opposite direction in a release direction.

According to the invention, the actuating ring 15 has an overload protection which, when the actuating ring 15 and thus the external thread 14 is rotated in the closure direction to establish the screw connection, limits the closure torque to a limit closure torque, thereby preventing impairment of or damage to the components of the screw connection, in particular the external thread 14 and internal thread 11.

In addition, when the limit closure torque is reached, the components of the actuating ring 15 forming the overload protection cause a clearly audible clicking sound, through which a user who manually actuates the actuating ring 15 receives an audible warning or general information that the limit closure torque has been reached.

Alternatively, the actuating ring 15 can also be actuated by means of a robot.

Figure 5:
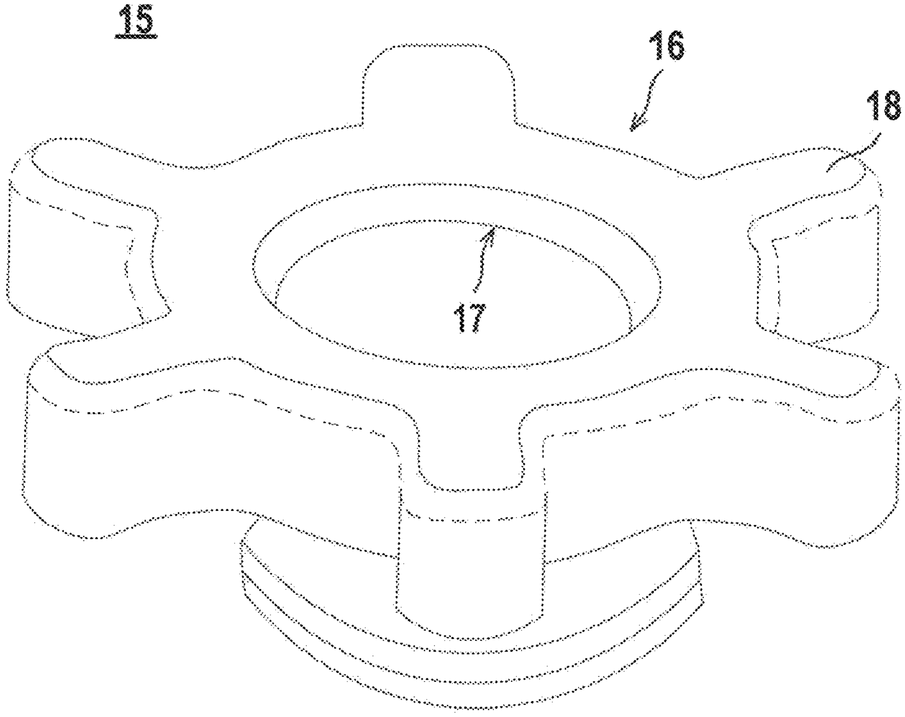
FIG. 5: Perspective depiction of the actuating ring of the dispense head.
Figure 6:
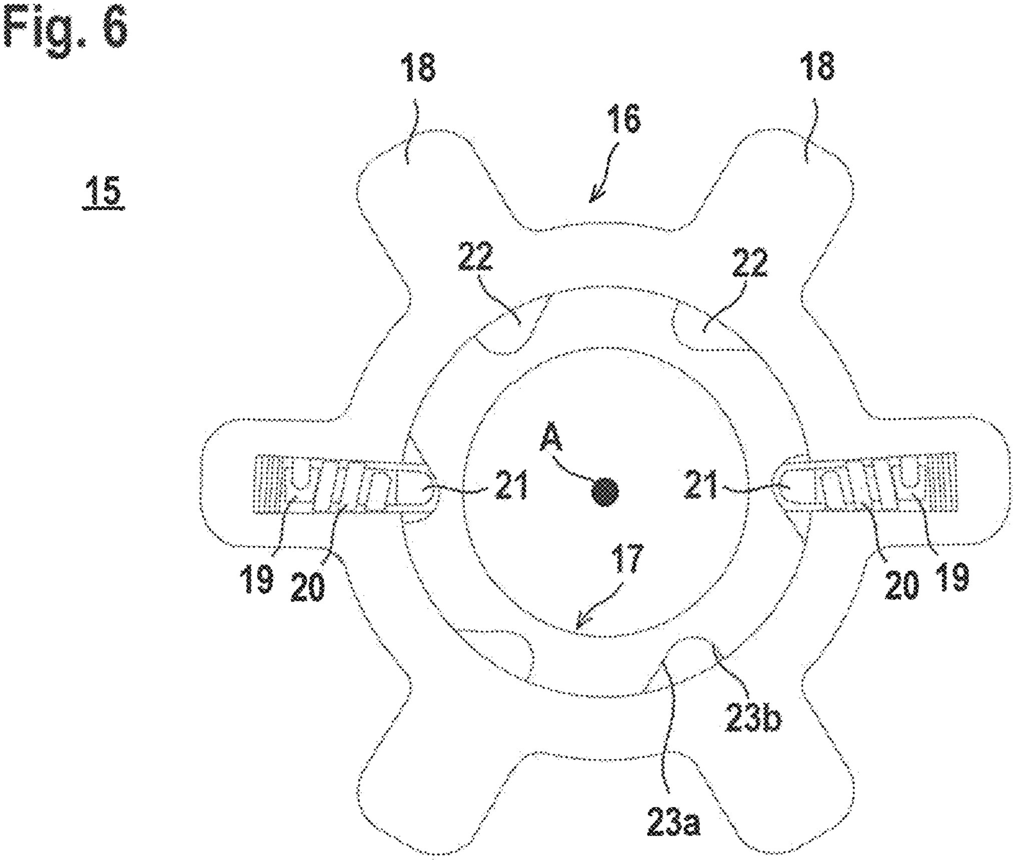
FIG. 6: Sectional depiction of the dispense head.

FIGS. 5 and 6 show the actuating ring 15 in a single depiction. The actuating ring 15 consists of an outer ring 16 and an inner ring 17.

The outer ring 16 and inner ring 17 are arranged concentrically to a center axis A of the actuating ring 15 and can be rotated about this axis of rotation. The center axis A runs perpendicular to the drawing plane of FIG. 6.

The outer contour of the inner ring 17, in particular its outer jacket surface, is adapted to the inner contour, in particular the inner jacket surface of the outer ring 16, in such a way that the outer jacket surface of the inner ring 17 rests against the inner jacket surface of the outer ring 16 with little play, so that the inner ring 17 is rotatable relative to the outer ring 16.

The inner ring 17 is firmly connected to the outer ring 16, wherein the inner ring 17 and the outer ring 16 advantageously consist of a plastic injection-molded part. In this way, a rotary movement of the inner ring 17 is directly transferred to the external thread 14.

The outer ring 16 has six grip segments 18 arranged equidistantly in the circumferential direction, which project outwards in the radial direction beyond the outer jacket surface of the ring-shaped base body 4*b*. The grip segments 18 each have identical outer contours. A user can simply grip the grip segments 18 and thus rotate the actuating ring 15.

In each of two opposite grip segments 18 there is a cavity 19 running in a radial direction and opening out at the inner jacket surface of the outer ring 16.

A locking segment 21 is spring-mounted in this cavity by means of a spring element 20. The spring element 20 and the locking segment 21 form an overload element with which the overload protection is formed.

Corresponding to this, the inner ring 17 has recesses 22 which open out on the outer jacket surface of the inner ring 17. The recesses 22 are identical and adapted to the shape of the locking segments 21 of the overload elements.

In the present case, six recesses 22 are provided, which are arranged equidistantly, i.e. are respectively arranged offset from each other by 60°.

Figure 7A:
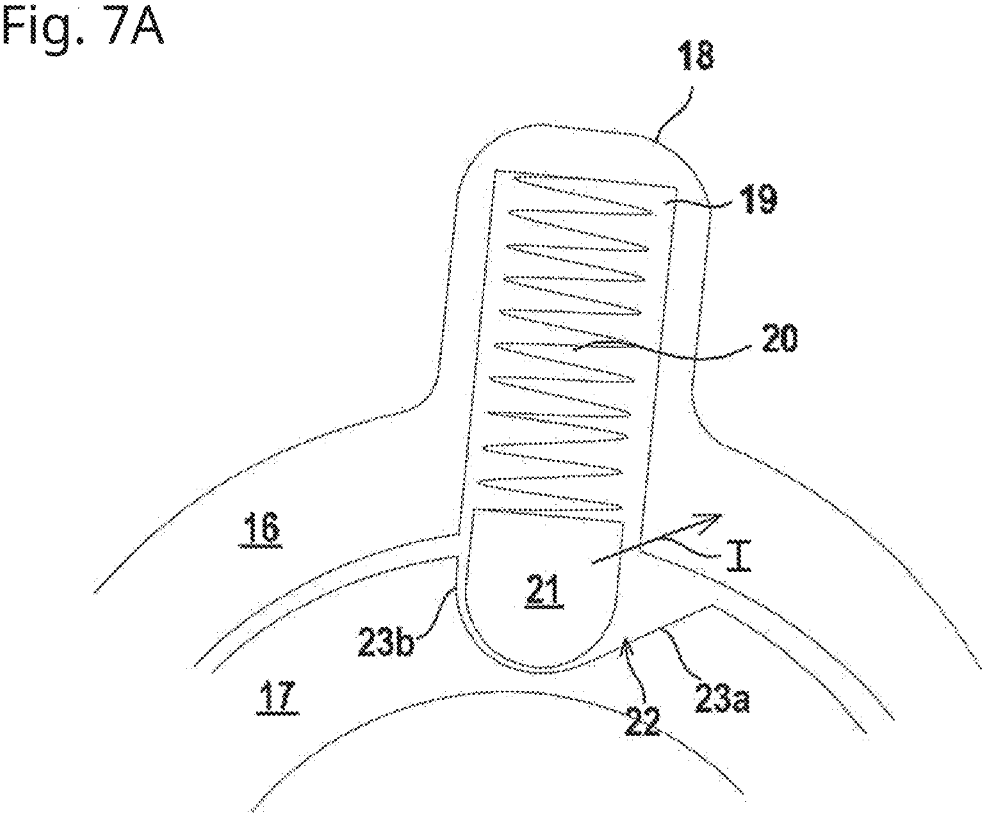
FIG. 7A: Enlarged partial depiction of the arrangement according to FIG. 6 with an overload element in a locking position.
Figure 7B:
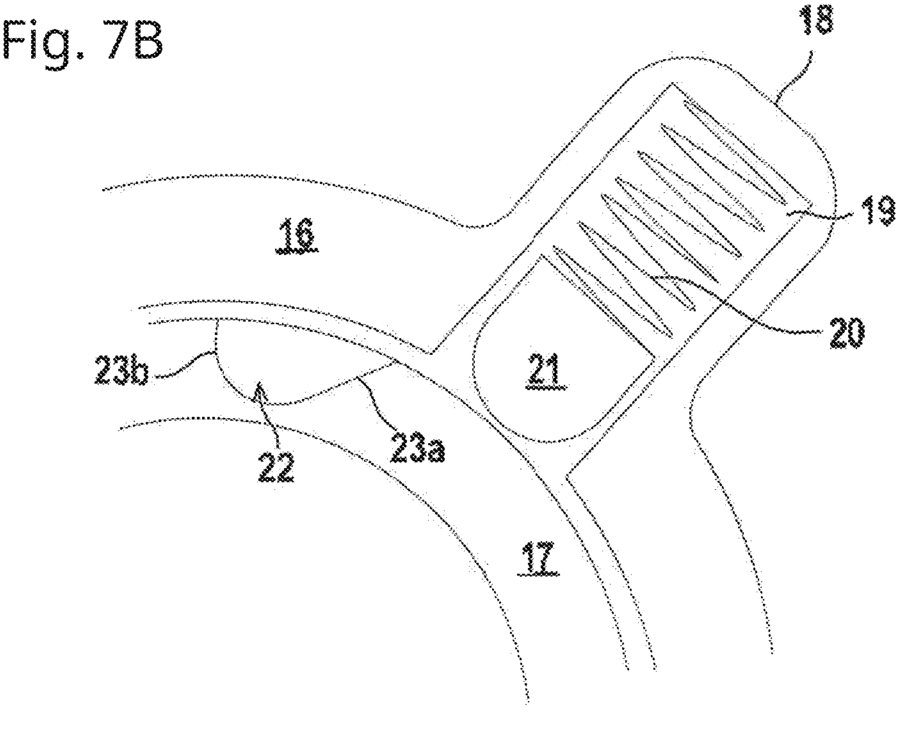
FIG. 7B: Enlarged partial depiction of the arrangement according to FIG. 6 with an overload element in a release position.

The recesses 22 are asymmetrical, as shown in FIG. 6 and the enlarged partial views of FIGS. 7*a* and 7*b*.

Each recess 22 is bounded by a wall formed by the ring body of the inner ring 17. The segment 23*a* of the wall lying in the closure direction has a flatter gradient than the segment 23*b* of the wall lying in the release direction.

The gradient of the segment 23*a* of the wall lying in the closure direction is dimensioned in such a way that the locking segment 21 is guided out of the recess 22 via this segment 23*a* of the wall when the limit closure torque is reached.

Furthermore, the gradient of the segment 23*b* of the recess 22 lying in the release direction is dimensioned in such a way that the locking segment 21 is held in the recess 22 when the actuating ring 15 is rotated in the release direction.

The function of the overload protection is explained below with reference to FIGS. 5, 6, 7*a* and 7*b*.

In an initial position, the outer ring 16 and the inner ring 17 are coupled by the overload elements, by, as shown in FIG. 6, the locking segments 21 of the two overload elements respectively engaging in a recess 22 of the inner ring 17. The spring forces of the respective spring element 20 ensure that the locking segment 21 is extended over the edge of the cavity and projects into the respective recess 22.

If the actuating ring 15 is then rotated in the closure direction by a user or a robot gripping the outer ring 16 at the grip segments 18, the inner ring 17 is rotated with the outer ring 16 so that the screw connection is formed.

As soon as a limit closure torque is reached when the screw connection is formed, the external thread 14 screwed to the internal thread 11 exerts a counterforce against further tightening of the actuating ring 15, which counterforce results in the locking segments 21 being guided out of the respective recess 22. This is illustrated in FIG. 7*a* with arrow I.

The gradient of the segment 23*a* of the wall bounding the recess 22 is adapted accordingly.

When the locking segment 21 is disengaged from the recess 22, an audible clicking sound is heard, which indicates that the limit closure torque has been reached.

After each locking segment 21 has been disengaged from the respective recess 22, it rests against the outer jacket surface of the inner ring 17, as shown in FIG. 7*b*. As a result, each locking segment 21 is pushed completely into the respective cavity 19. As a result, the outer ring 16 is decoupled from the inner ring 17, thus providing overload protection. Further rotating of the outer ring 16 is not transferred to the inner ring 17, which prevents the screw connection from being subjected to a closure torque greater than the limit closure torque.

If the screw connection is then released again, the actuating ring 15 is rotated in the opposite direction. First, the locking segments 21 are again guided into the recesses 22. When the actuating ring 15 is rotated further, the rotary movement of the outer ring 16 is transferred to the inner ring 17, since the locking segments 21 are then held securely in the recesses 22 due to the steeper gradients of the segments 23 of the walls.

LIST OF REFERENCE NUMERALS (1) Dispensing system
(2) Container
(3) Liquid
(4) Dispense head
(4*a*) Liquid connection
(4*b*) Base body
(5) Dip tube
(6) Container opening
(7) Line
(8) Pump
(9) Tube body
(10) Head part
(11) Internal thread
(12) Lug
(13) Ventilation port
(14) External thread
(15) Actuating ring
(16) Outer ring
(17) Inner ring
(18) Grip segment
(19) Cavity
(20) Spring element
(21) Locking segment
(22) Recess
(23) Segment
(23*a*) Segment (in closure direction)
(23*b*) Segment (in release direction)
(A) Center axis

What is claimed is:

1. A dispensing system, comprising:

a dispense head; and a container, wherein the dispense head is connectable to a container opening of the container by a screw connection, so that stored material is dispensable from or suppliable to the container by the dispense head; and an actuating ring arranged on the dispense head, wherein the screw connection is established by rotating the actuating ring in a closure direction, wherein the screw connection is released by rotating the actuating ring in a release direction, and wherein the actuating ring has an overload protection limiting an effective closure torque to a limit closure torque when the screw connection is established, wherein the actuating ring is connected to a thread that is screwable onto or unscrewable from a mating thread in an area of the container opening by rotating the actuating ring, wherein the actuating ring has an outer ring and an inner ring firmly connected to the thread, and wherein overload elements form the overload protection and cause a detachable coupling of the outer ring and the inner ring, and wherein each overload element has a locking segment spring-mounted in a cavity running in the radial direction and opening out on the inner jacket surface of the outer ring.

2. The dispensing system according to claim 1, wherein the mating thread is located in the container opening or in a dip tube mounted in the container opening.

3. The dispensing system according to claim 1, wherein the thread is an external thread and the mating thread is an internal thread.

4. The dispensing system according to claim 1, wherein an outer jacket surface of the inner ring closely rests against an inner jacket surface, wherein the outer ring and the inner ring are rotatable around a common axis of rotation.

5. The dispensing system according to claim 1, wherein the overload elements arranged in a locking position cause a coupling of the outer ring and the inner ring, so that the inner ring is corotated when the outer ring is rotated, and when a limit closure torque is reached when the screw connection is established, the overload elements are automatically transferred to a release position, so that the inner ring is not corotated when the outer ring is rotated in the closure direction.

6. The dispensing system according to claim 5, wherein the overload elements are automatically transferred from the release position to the locking position when the actuating ring is rotated in the release direction.

7. The dispensing system according to claim 1, wherein the inner ring has a plurality of recesses arranged at a distance from one another in the circumferential direction and opening out on its outer jacket surface, wherein in the locking position of an overload element its locking segment projects into one of the recesses.

8. The dispensing system according to claim 7, wherein, in the release position of an overload element, its locking segment rests against the outer jacket surface of the inner ring, as a result of which the locking segment is fully retracted into the cavity.

9. The dispensing system according to claim 7, wherein the recesses are identical and arranged equidistantly in the circumferential direction of the inner ring.

10. The dispensing system according to claim 7, wherein the number of recesses is greater than the number of overload elements, wherein the arrangement of the overload elements on the outer ring is adapted to the arrangement of the recesses on the inner ring in such a way that when the outer ring and the inner ring are coupled, the locking segments of all overload elements respectively engage in one of the recesses.

11. The dispensing system according to claim 7, wherein each recess is bounded by a wall, wherein a segment of the wall lying in the closure direction has a flatter gradient than a segment of the wall lying in the release direction.

12. The dispensing system according to claim 11, wherein the gradient of the segment of the wall lying in the closure direction is dimensioned in such a way that the locking segment is guided out of the recess via this segment of the wall when the limit closure torque is reached, and in that the gradient of the segment of the recess lying in the release direction is dimensioned in such a way that the locking segment is held in the recess when the actuating ring is rotated in the release direction.

13. The dispensing system according to claim 1, wherein a clicking sound is generated when the overload protection engages.

14. The dispensing system according to claim 1, wherein the actuating ring, the thread and the mating thread are made of plastic.

* * * * *